(12) United States Patent
Zeitler (10) Patent No.: US 11,396,762 B2
(45) Date of Patent: Jul. 26, 2022

(54) CABLE OPERATED MECHANICAL LOCKING EXTERNAL DISCONNECT ENCLOSURE

(71) Applicant: Ron Zeitler, Saginaw, MI (US)

(72) Inventor: Ron Zeitler, Saginaw, MI (US)

(*) Notice: Subject to any disclaimer, the term of this patent is extended or adjusted under 35 U.S.C. 154(b) by 628 days.

(21) Appl. No.: 16/282,485

(22) Filed: Feb. 22, 2019

(65) Prior Publication Data
US 2020/0270907 A1 Aug. 27, 2020

(51) Int. Cl.
| E05B 65/10 | (2006.01) |
| E05B 63/20 | (2006.01) |
| E05C 7/00  | (2006.01) |
| E05B 79/20 | (2014.01) |
| E05B 53/00 | (2006.01) |

(52) U.S. Cl.
CPC ............ *E05B 65/106* (2013.01); *E05B 63/20* (2013.01); *E05B 65/1006* (2013.01); *E05B 53/005* (2013.01); *E05B 79/20* (2013.01); *E05C 7/00* (2013.01); *E05C 7/005* (2013.01); *Y10S 292/21* (2013.01); *Y10S 292/68* (2013.01); *Y10T 292/0848* (2015.04); *Y10T 292/0849* (2015.04); *Y10T 292/0854* (2015.04); *Y10T 292/0855* (2015.04); *Y10T 292/0908* (2015.04); *Y10T 292/1072* (2015.04)

(58) Field of Classification Search
CPC .......... E05C 7/00; E05C 7/005; E05B 53/005; E05B 79/20; E05B 65/106; E05B 63/20; E05B 65/1006; Y10S 292/68; Y10S 292/21; Y10T 292/1072; Y10T 292/0848; Y10T 292/0849; Y10T 292/0854; Y10T 292/0855; Y10T 292/0908

See application file for complete search history.

(56) References Cited

U.S. PATENT DOCUMENTS

| 129,038   | A | * | 7/1872  | La Due    | E05B 85/24  |
|           |   |   |         |           | 292/229     |
| 279,334   | A | * | 6/1883  | Clark     | E05B 7/00   |
|           |   |   |         |           | 292/36      |
| 388,229   | A | * | 8/1888  | Thode     | E05B 65/0007|
|           |   |   |         |           | 292/5       |
| 584,753   | A | * | 6/1897  | York      | E05F 17/001 |
|           |   |   |         |           | 49/17       |
| 998,642   | A | * | 7/1911  | Shean     | E05B 7/00   |
|           |   |   |         |           | 292/36      |
| 1,002,340 | A | * | 9/1911  | Van Dusen | E05B 63/20  |
|           |   |   |         |           | 292/32      |
| 1,041,700 | A | * | 10/1912 | Thornley  | E05B 65/462 |
|           |   |   |         |           | 312/217     |
| 1,051,918 | A | * | 2/1913  | Rowley    | E05C 9/043  |
|           |   |   |         |           | 292/7       |
| 1,183,902 | A | * | 5/1916  | O'Connor  | E05B 65/025 |
|           |   |   |         |           | 70/81       |

(Continued)

*Primary Examiner* — Christine M Mills
*Assistant Examiner* — Faria F Ahmad (57) ABSTRACT

A cable operated mechanical locking external disconnect enclosure for multi-point latch uses. The enclosures provide safety, in that, once the main enclosure door is closed, and the disconnect is turned on, the main enclosure is locked and only automatically unlocks when the disconnect is turned off. Thus, the door of the disconnect enclosure is locked when the disconnect or circuit breakers are turned to the on position. There is also a manual by-pass latch for each door.

2 Claims, 10 Drawing Sheets

(56) References Cited

U.S. PATENT DOCUMENTS

| | | | | |
|---|---|---|---|---|
| 1,212,993 A * | 1/1917 | O'Connor | | 312/324 |
| 1,247,052 A * | 11/1917 | Wilson | | E05F 11/00 |
| | | | | 292/5 |
| 1,371,482 A * | 3/1921 | Hauserman | | E05B 17/0025 |
| | | | | 49/395 |
| 1,480,643 A * | 1/1924 | Thompson | | E05C 7/00 |
| | | | | 292/33 |
| 1,702,385 A * | 2/1929 | Kaser | | E05B 65/025 |
| | | | | 312/222 |
| 1,716,169 A * | 6/1929 | Hart | | E05B 65/0003 |
| | | | | 312/217 |
| 1,721,730 A * | 7/1929 | Goss | | E05C 7/00 |
| | | | | 70/283 |
| 1,790,130 A * | 1/1931 | Austin | | E05B 65/0003 |
| | | | | 312/222 |
| 1,791,134 A * | 2/1931 | Kaser | | E05B 65/0003 |
| | | | | 312/222 |
| 1,896,745 A * | 2/1933 | Hein | | E05C 7/02 |
| | | | | 292/171 |
| 1,936,818 A * | 11/1933 | Bales | | E05B 65/0003 |
| | | | | 312/222 |
| 2,991,866 A * | 7/1961 | James | | G07F 17/12 |
| | | | | 194/226 |
| 3,677,043 A * | 7/1972 | Cox | | E05B 47/00 |
| | | | | 70/92 |
| 3,688,531 A * | 9/1972 | Hawkins | | E05B 63/20 |
| | | | | 70/151 R |
| 4,146,994 A * | 4/1979 | Williams | | E05B 63/20 |
| | | | | 49/367 |
| 4,349,223 A * | 9/1982 | Spector | | E05C 19/003 |
| | | | | 292/259 R |
| 4,477,130 A * | 10/1984 | Frantz | | E05C 19/001 |
| | | | | 16/388 |
| 5,061,011 A | 10/1991 | Miller | | |
| 5,114,192 A | 5/1992 | Toledo et al. | | |
| 5,161,837 A | 11/1992 | O'Brien, II | | |
| 5,575,515 A * | 11/1996 | Iwamoto | | E05B 47/0002 |
| | | | | 221/154 |
| 5,582,472 A * | 12/1996 | Lyons | | A47B 81/00 |
| | | | | 292/238 |
| 5,816,017 A | 10/1998 | Hunt et al. | | |
| 5,829,360 A * | 11/1998 | Rench | | E05B 79/20 |
| | | | | 105/355 |
| 6,250,015 B1 * | 6/2001 | Gillispie | | B01L 1/50 |
| | | | | 312/324 |
| 6,351,977 B1 | 3/2002 | Pedroso et al. | | |
| 7,318,632 B2 * | 1/2008 | Bidinger | | E05B 53/001 |
| | | | | 312/218 |
| 7,370,890 B2 * | 5/2008 | Samsel | | E05B 53/001 |
| | | | | 292/162 |
| 9,540,842 B2 * | 1/2017 | Storr | | E05B 65/0811 |
| 9,580,944 B2 * | 2/2017 | Arlinghaus | | E05B 65/1046 |
| 10,078,929 B1 * | 9/2018 | Chen | | G07C 9/00896 |
| 10,460,888 B1 * | 10/2019 | Zeitler | | H01H 3/20 |
| 2017/0009489 A1 * | 1/2017 | Steinman | | E05B 65/5215 |
| 2020/0115029 A1 * | 4/2020 | Movsesian | | B64C 1/1469 |

\* cited by examiner

CABLE OPERATED MECHANICAL LOCKING EXTERNAL DISCONNECT ENCLOSURE

BACKGROUND OF THE INVENTION

This specification deals with a cable operated mechanical locking external disconnect enclosure for multi-point latch uses. The enclosures of this invention provide safety, in that, once the main enclosure door is closed, and the disconnect is turned on, the main enclosure is automatically unlocked when the disconnect is turned off. Thus, the door of the disconnect enclosure is locked when the disconnect or circuit breakers are turned to the on position.

Door closing and locking mechanisms have been developed for a variety of purposes. One such development can be found in U.S. Pat. No. 5,061,011 that issued to Meriwether on Oct. 29, 1991 in which there is disclosed a door closure arrangement for paint cabinets or enclosures containing combustible materials. A spring biased, lever actuated mechanism automatically latches or locks the doors when they are rotated into the closed position.

U.S. Pat. No. 5,114,192 that issued May 19, 1992 to Toledo, et al deals with a latch assembly for use with a panic exit device. The latch member pivots downwardly upon opening pressure on the door and actuation of the panic exit device, to release the latch member from the receiving lug of the system.

There is disclosed in U.S. Pat. No. 5,161,837 that issued Nov. 10, 1992 to O'Brien II, a rod casing for activating vertically arranged latch bolts.

A security door lock with remote control is disclosed in U.S. Pat. No. 6,351,977 that issued on Mar. 5, 2002 to Pedroso, et al. The device is electrically operates, strong, security system comprising a lock with remote control installed in a wall adjacent to a door frame or under a door. The device is capable of securing the door at the top and the bottom.

Hunt, et al, in U.S. Pat. No. 5,816,017, that issued Oct. 6, 1998 deals with a fire retardant door having a vertical latch stile extending the length of the stile for receiving the elements of a concealed vertical rod exit device along with an expanding, fire resistant material for sealing the opening when subjected to heat.

THE INVENTION

Thus, what is disclosed and claimed herein is a cable operated mechanical locking external disconnect enclosure. The cable operated mechanical locking external disconnect enclosure comprises a housing, wherein the housing is a main metal cabinet having at least one main enclosure door in a front of the enclosure. Affixed to a side of the main metal cabinet is a disconnect enclosure cabinet. Each of the cabinets has a rotatable door handle which may or may not be key lockable.

The disconnect enclosure cabinet door handle is affixed to a rod, wherein the rod extends through the disconnect enclosure cabinet door and extends to and mechanically attaches to a power module such that power to the power module is capable of being turned on or off by the disconnect enclosure cabinet handle and rod.

Fixedly attached to the rod and located at the inside of the disconnect enclosure cabinet door, is a rotary lock. The rotary lock interfaces and interacts with a pivoting latch. The pivoting latch is fixedly located on an inside wall of the disconnect enclosure cabinet.

The pivoting latch has attached to it, a push-pull cable, the push-pull cable being fixedly attached to a first defeater assembly by a top spring, the first defeater assembly being fixedly attached on an inside wall of the main metal cabinet. The first defeater assembly is comprised of a main assembly and an adjunct assembly. The first defeater of the first defeater assembly interfaces and interacts with a second mechanical defeater assembly fixedly attached on an inside surface of the main enclosure. The adjunct assembly is fixedly attached to an inside surface of the main enclosure door.

There is a first defeater of the first defeater assembly that is fixedly attached to a lower spring. The lower spring is fixedly attached at an opposite end of the spring to a second mechanical defeater assembly. The second mechanical defeater assembly is fixedly attached to an inside wall of the metal cabinet.

The second mechanical defeater assembly is comprised of a second main assembly and a second adjunct assembly. A second defeater of the second defeater assembly interfaces and interacts with a second adjunct assembly that is fixedly attached to an inside surface of the main enclosure door.

Especially useful is the use of a rotary lock mounted on a rod inside of the disconnect enclosure door, and the use of double spring configuration on the push-pull cable at the site of the first defeater assembly.

DETAILED DESCRIPTION OF THE SPECIFICATION

This specification deals with a cable operated mechanical locking external disconnect enclosure for multi-point latch uses.

Figure 1:
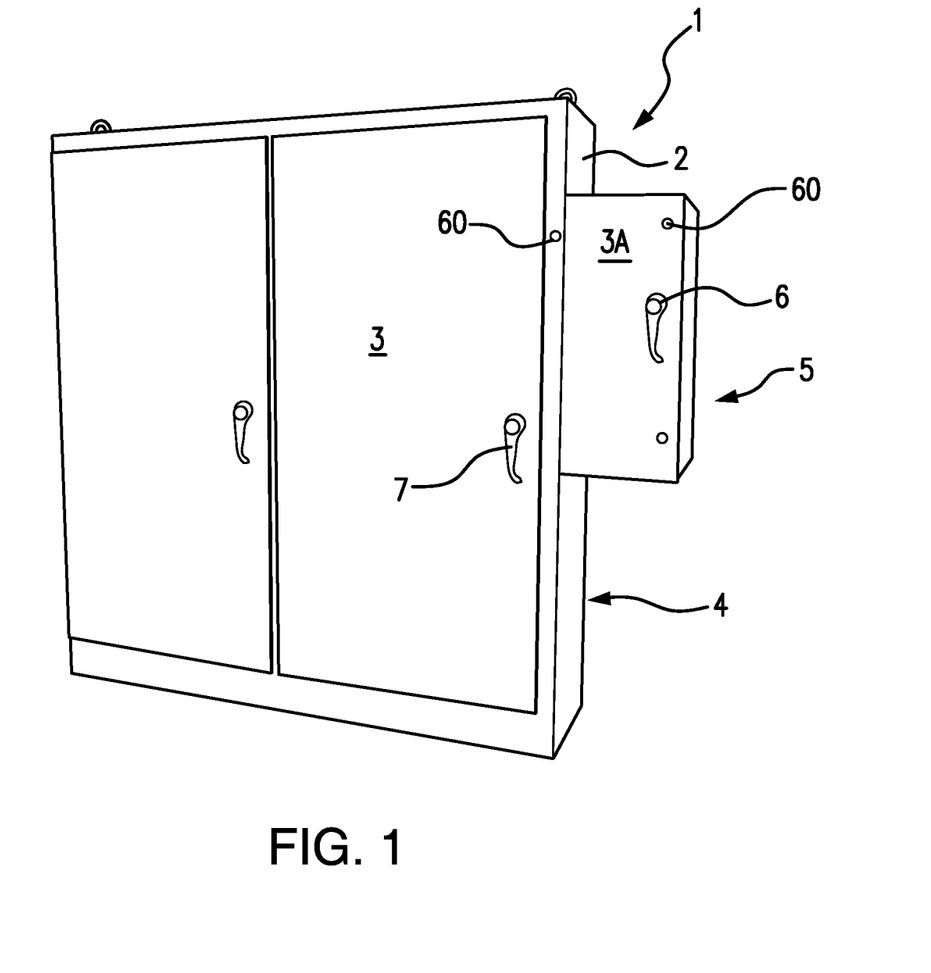
FIG. 1 is a full front view in perspective of an enclosure of this invention.

FIG. 1 is a full front view in perspective of a device 1 of this invention in which there is shown the housing 2, front enclosure doors 3 and 3A, the main enclosure 4 and the disconnect enclosure 5. Shown are handles 6 and 7, respectively. Also shown are the ¼ turn latches 60 for manual defeater bypasses for each cabinet. It should be noted that the Figures herein shown the handle and mechanism being mounted on the right hand side of each cabinet door, but it is contemplated within the scope of this invention to locate the handles wherever it is convenient for the user, for example, on the right hand side of the door or the left hand side of the door.

The back of this enclosure 4 is open, in that, the device 1 is mounted against a wall such that a back panel is not needed. It is contemplated within the scope of this invention to include a back panel in the enclosure 4, if it is desired to mount the device 1 without a wall support.

Figure 2:
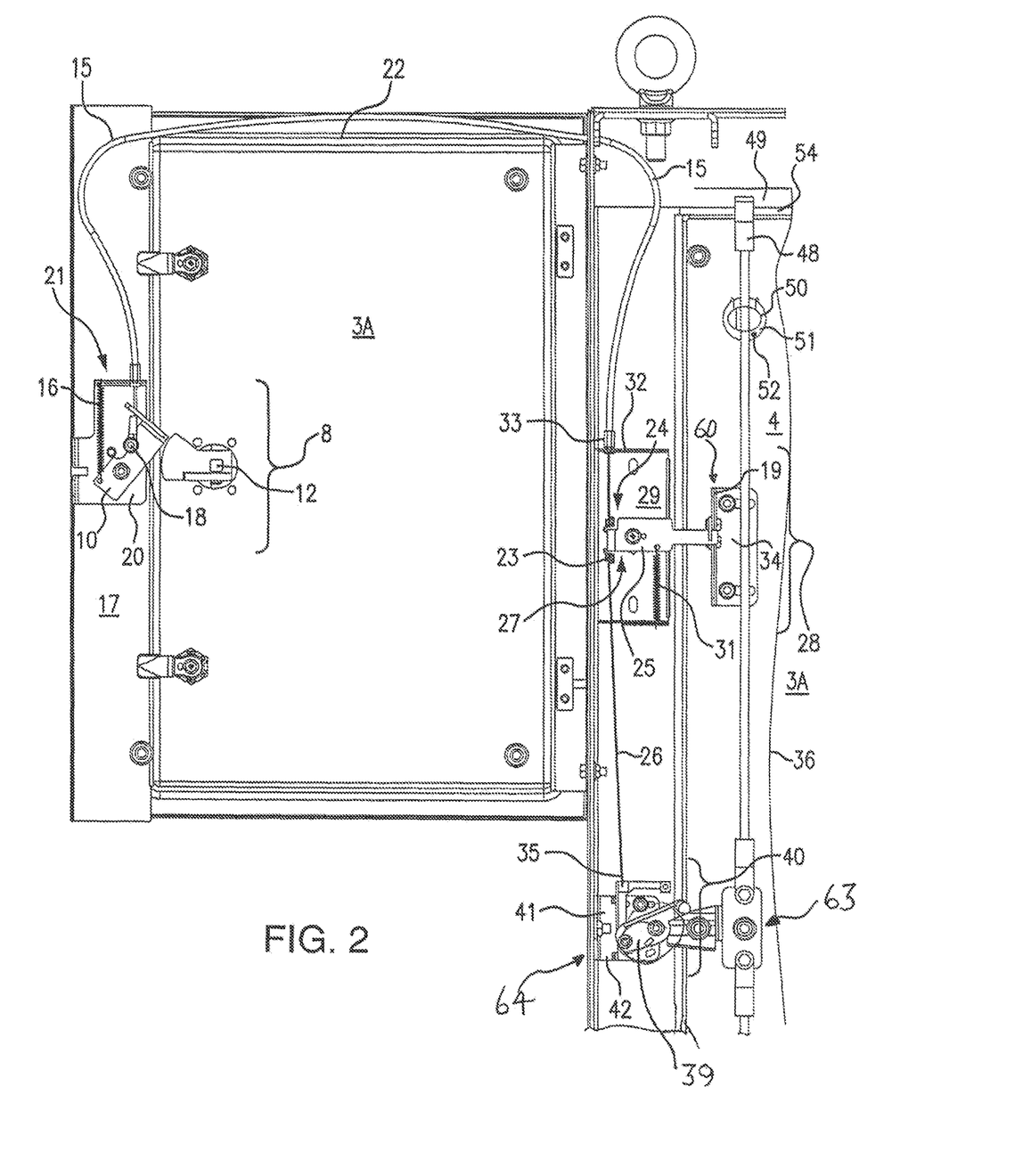
FIG. 2 is a full view of the operating apparatus of this invention shown mounted on the inside of the front of the enclosure of FIG. 1.

In FIG. 2, there is a full inside view of the main enclosure 4, and disconnect enclosure 5, both of which are typically manufactured from metal, there is shown a latch and release assembly 8.

Figure 3:
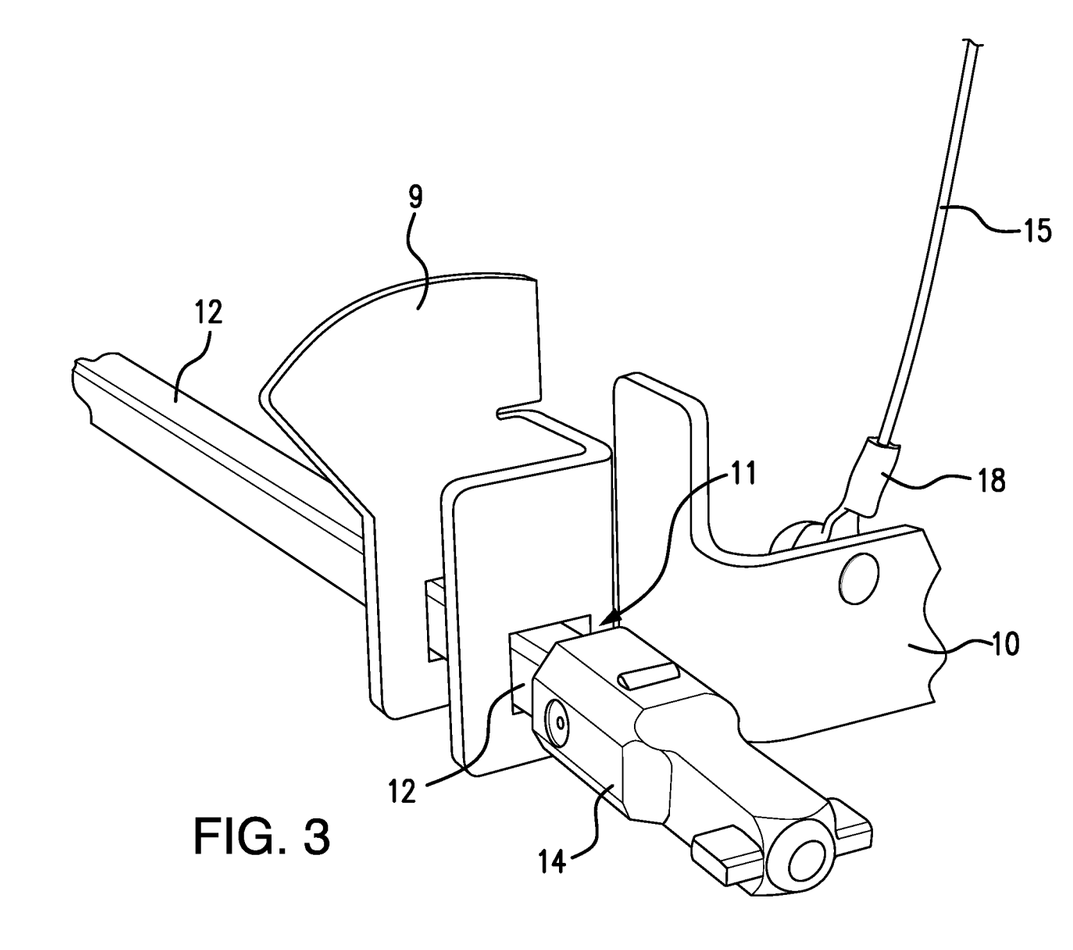
FIG. 3 is a full front view of the pivoting latch, rotary lock assembly on the inside of the disconnect enclosure cabinet without showing the cabinet.
Figure 4:
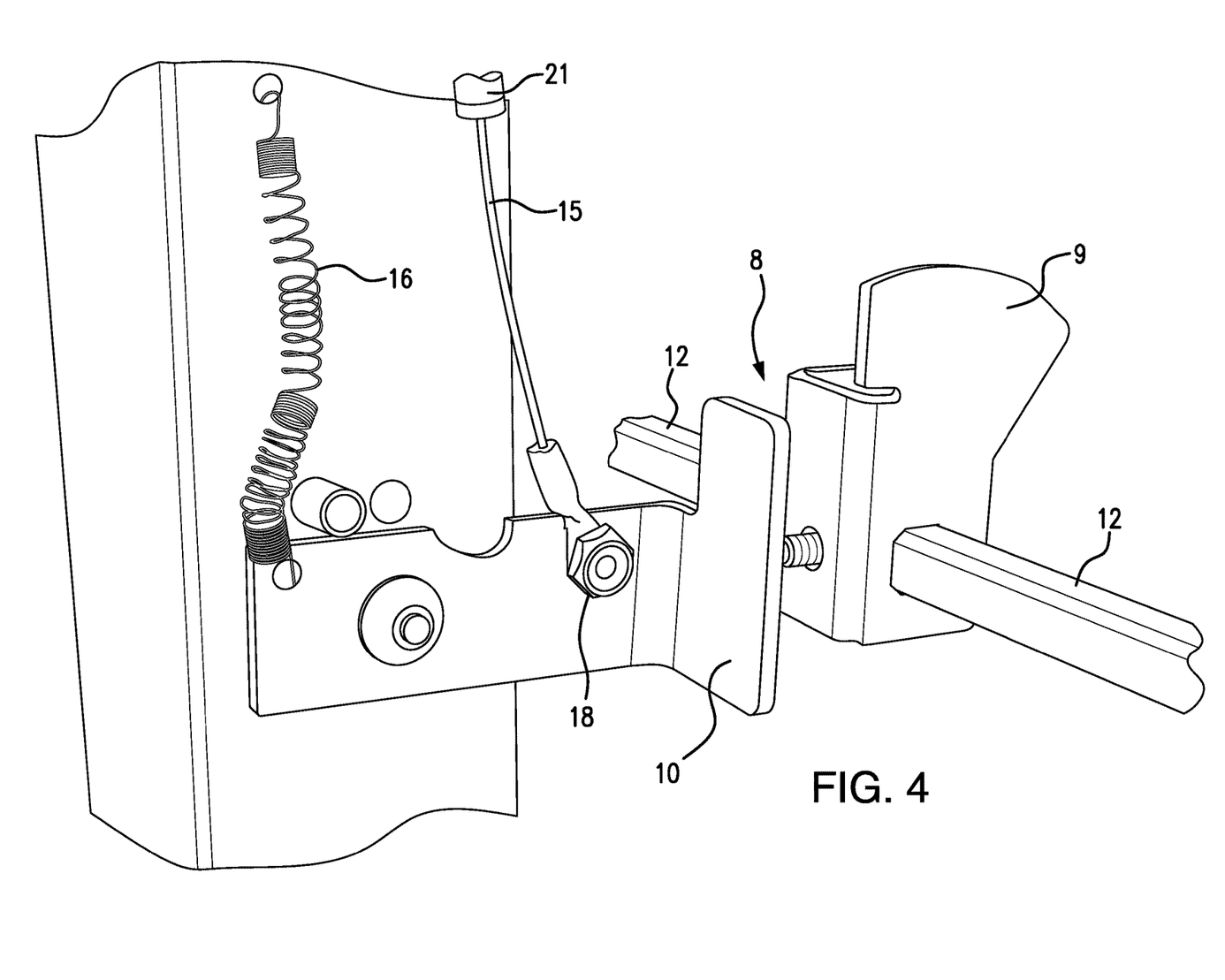
FIG. 4 is a full back view of the pivoting latch, rotary lock assembly on the inside of the disconnect enclosure cabinet without showing the cabinet.
Figure 5:
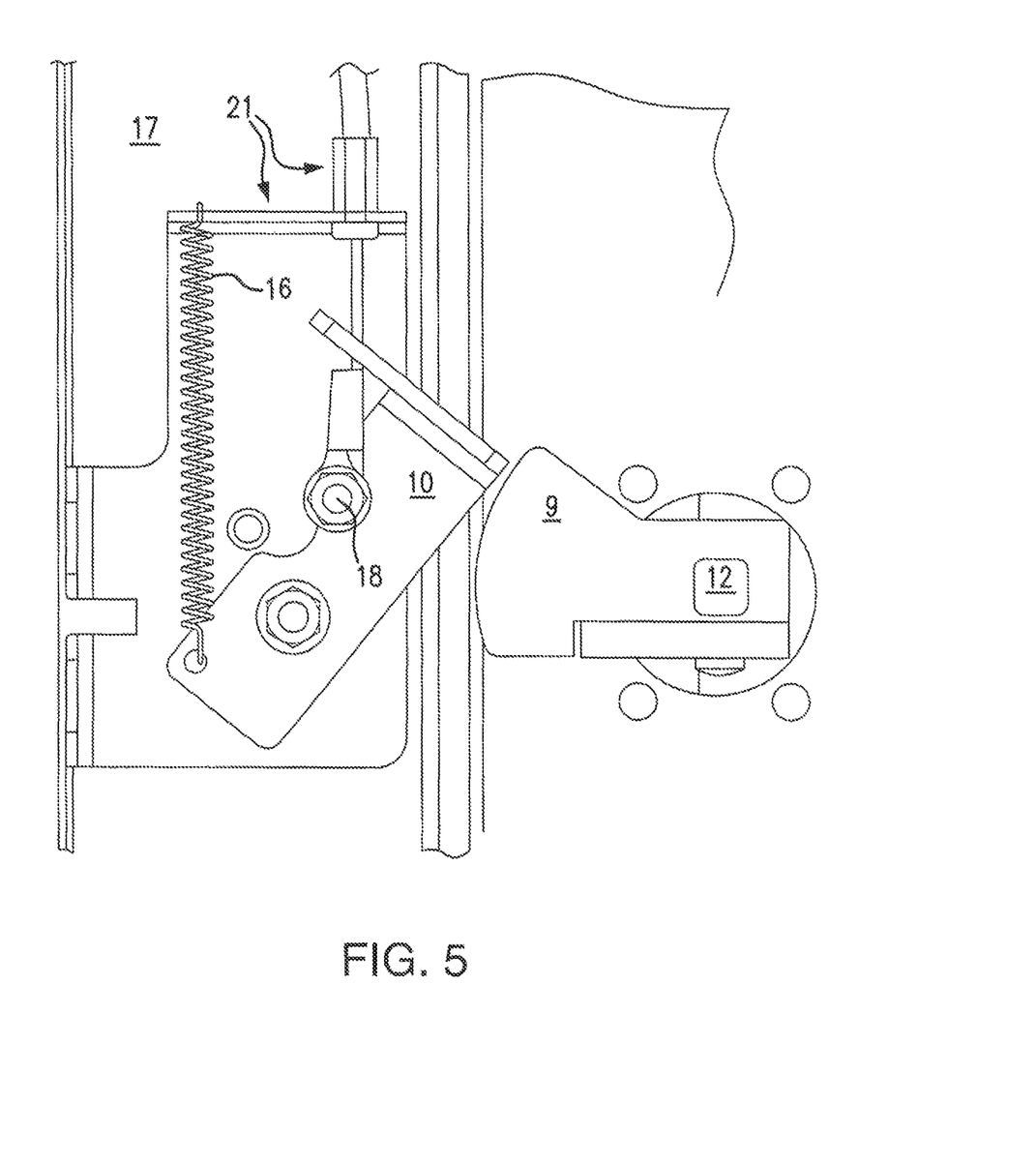
FIG. 5 is a full back view of the main assembly of the rotary lock and pivoting latch assembly.
Figure 6:
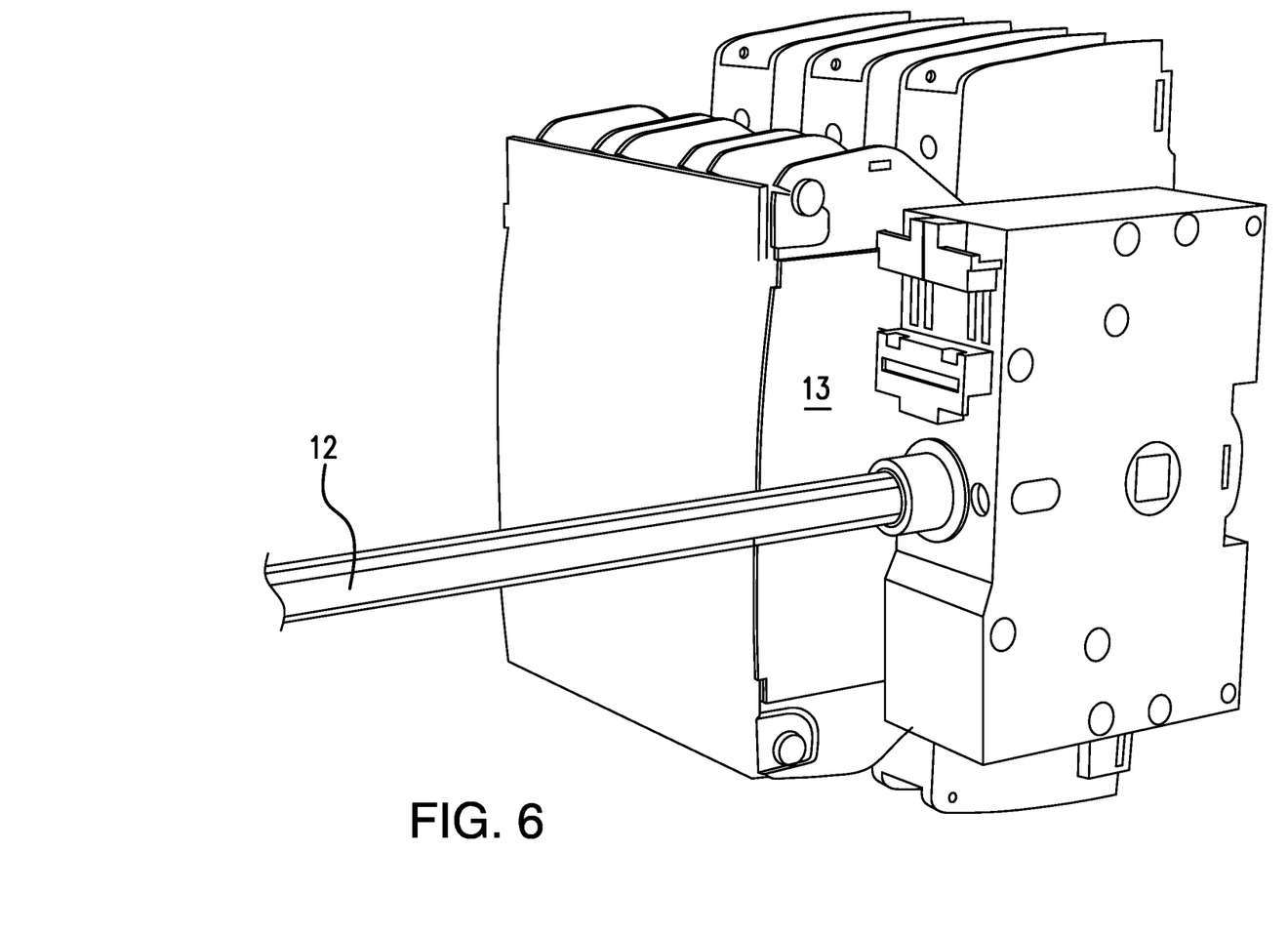
FIG. 6 is a view in perspective of a useful power module, the power module not being part of this invention.

Specifically, and also referring to FIGS. 3, 4, and 5, there is shown a novel rotary lock 9 and pivot latch 10 combination. FIG. 3 is a partial of the latch and release assembly 8 from the front side wherein there is shown at 11 a coupling 14 for the outside handle 6 and the rod 12. As shown, the rod 12 extends through the rotary lock 9 and extends to the power module 13 shown in FIG. 6. Interfacing with the rotary lock 9 and interactive therewith is the pivoting latch 10, it being noted that the rotary lock 9 is unitary in nature. The rod 12 is square or hexagonal in shape such that the coupling 14 and the rotary lock 9 both rotate with the rotation of the rod 12. This can also be accomplished with a round rod and a set screw or pin.

The details of the latch and release assembly 8 are shown in FIG. 4 wherein there is shown the rotary lock 9, the pivoting latch 10, the push-pull cable 15, its attachment 18 to the pivoting latch 10, a counter balancing extension spring 16 and a portion of the inside wall where the pivoting latch 10 is mounted. There is also shown in FIG. 4 a mounting bracket 20 for the assembly, and a cable restraint attachment 21.

When the pivoting latch 10 is raised by the rotary lock 9 by turning the handle 7, the push-pull cable 15 is moved to allow the first defeater assembly 28 (FIG. 9) to move horizontally and catch the disconnect hook 19 of the first adjunct assembly 60 (FIG. 2) which locks the main enclosure door.

Figures 8, 9:
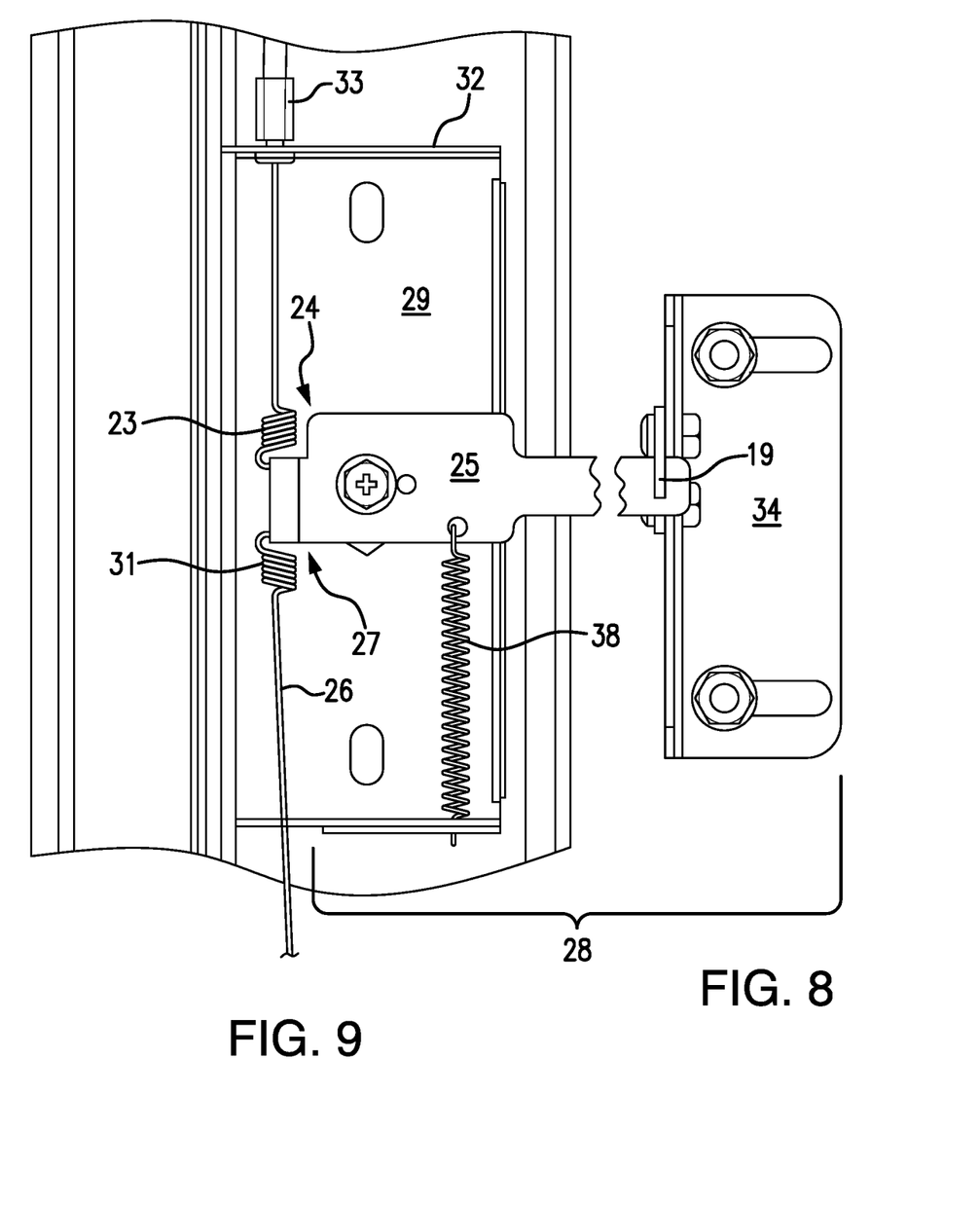
FIGS. 8 and 9 are an enlarged full back view of the first defeater assembly of this invention.

It will be observed that the push-pull cable 15 loops up and over the door frame 22 of cabinet door 3A and into the main enclosure 4 where it connects by an extension spring 23 to the back top edge 24 of the first defeater 25. As shown in FIG. 2, there is a continuum cable 26 of the push-pull cable 15 that is attached to the bottom back edge 27 of the first defeater 25 and that extends to a second defeater assembly 40 on a second adjunct assembly 63 (FIG. 2). FIGS. 8 and 9 show the overall relationship of the first defeater assembly 28.

Turning now to FIGS. 8 and 9, which in combination show the first defeater assembly 28, FIG. 8 being the latch portion, and FIG. 9 being the defeater bar portion, there is shown a defeater mounting bracket 29, extension spring 31, cable restraint plate 32, cable attachment 33, disconnect hook 19, and, the mounting plate 34 for the disconnect hook 19.

Figure 10A:
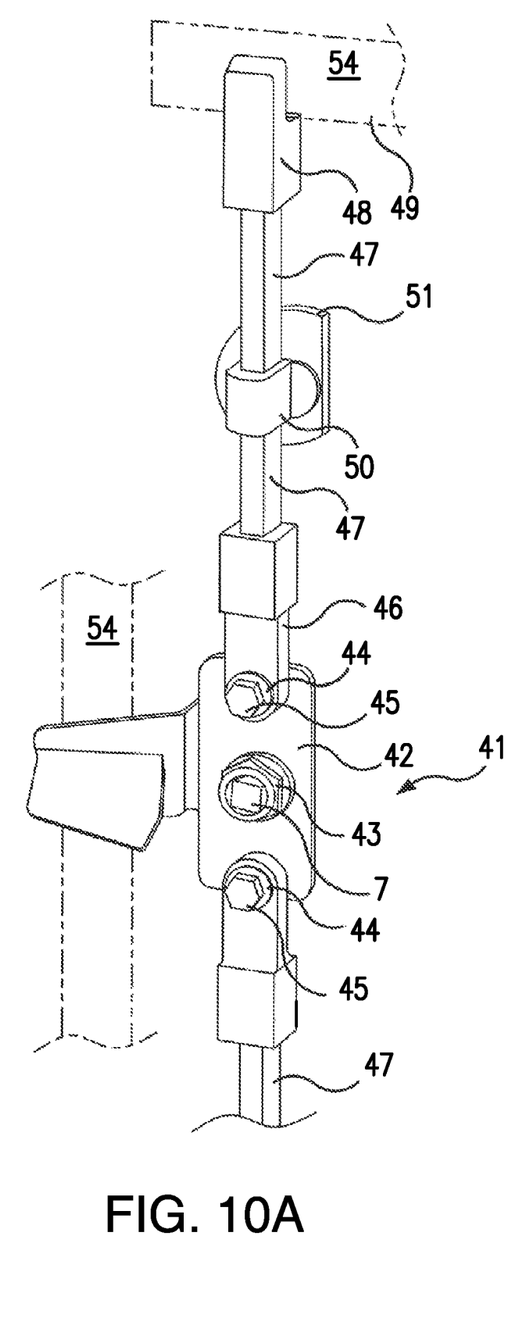
FIGS. 10A, 10B and 10C show the details of a rod assembly latching mechanism for doors. These are not part of the claimed invention.

As noted Supra, the cable continuum 26 has its leading end 35 attached to a second defeater assembly 40. The reason for the second defeater assembly 40 is that the main door 3 has a sophisticated locking mechanism 36 as shown in FIGS. 2, 10A, B, and C, wherein the door is securely locked at both the top 37 and the bottom (not shown). Thus, the locking assembly that is controlled to unlock door 3A and door 3 must be attached to the same system.

In FIGS. 2, and 10A, B, and C, there is shown a door rod assembly useful in this invention. The door rod assembly is not a part of the instant invention but is included to illustrate the novelty of the instant invention in cooperation with such a door rod assembly. The illustration does not show the lower rod and associated components, which are a duplication of the assembly starting from the top at the latch base 41.

Figure 10B:
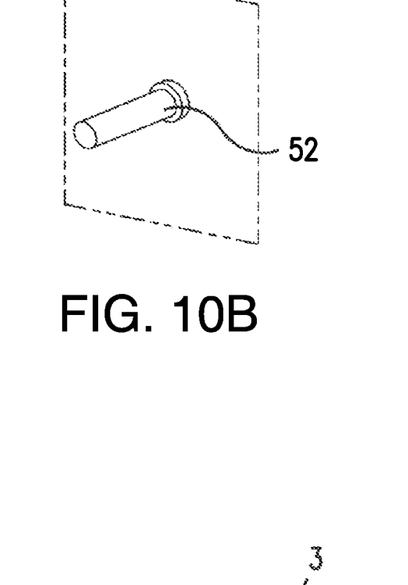
Figure 10C:
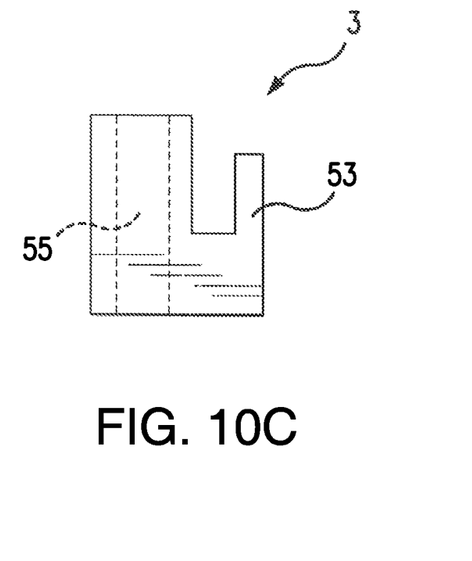
Figure 11:
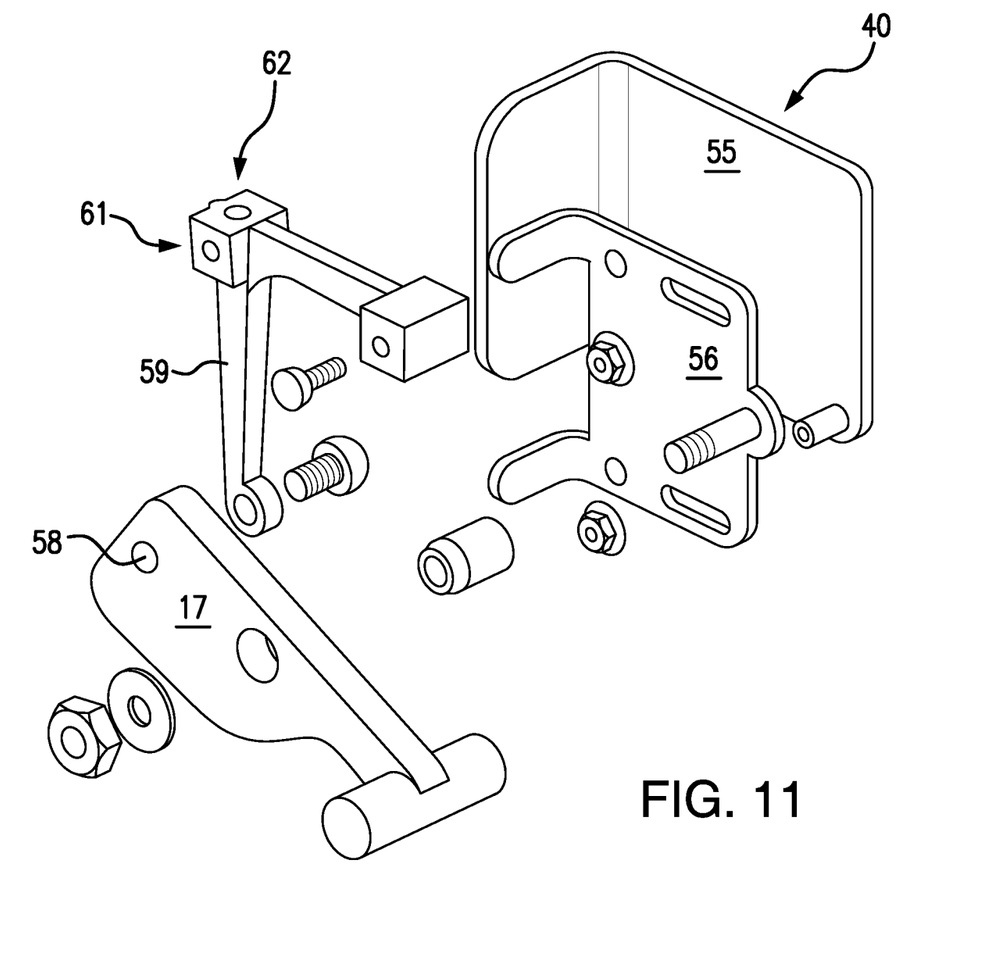
FIG. 11 is an exploded illustration of the second defeater assembly shown for clarity sake.

In the second main assembly 64 there is shown a latch base 41 which is comprised of a flat metal elongated plate 42 having a centered opening 43. This centered opening 43 is for the insertion of a door opening handle 7 inserted into the opening 43 from the opposite side of the latch base 41. Use of this handle facilitates the locking, unlocking, and opening of the door.

On either end of the latch base 43 are openings 44 near the edge. The openings have bolts 45 inserted therein to rotatably couple a rod adapter 46 to the latch base 41. The rod adapter 46 contains a rod 47, which extends some length to accommodate the distance between the locked latch base 41 and the frame of the door, taking into consideration the length of the ramp shoe 48. The ramp shoe 48 is configured such that when door 3A is closed (the door is latched and locked), the ramp shoe 48 fits over the edge 49 of the door frame 54 and secures the top of the door to the door frame.

In order to control and guide the rod 47, there is used a rod guide 50. The rod 47 slides through said rod guide 50. The rod guide 50 is attached to a rod guide base 51, which in turn is fastened to a door using a stud 52. The rod guide 50 has an elongated tip 53 (FIG. 10C) that rests against the side of the rod guide base 51 and prevents the rod 47 and associated assembly from moving in a sidewise fashion.

It should be noted, that a duplicate assembly is attached to the bottom of the latch base 43, and the rod adapter 46 and a portion of the rod 47 are shown in FIGS. 10A, B, and C.

Figure 7:
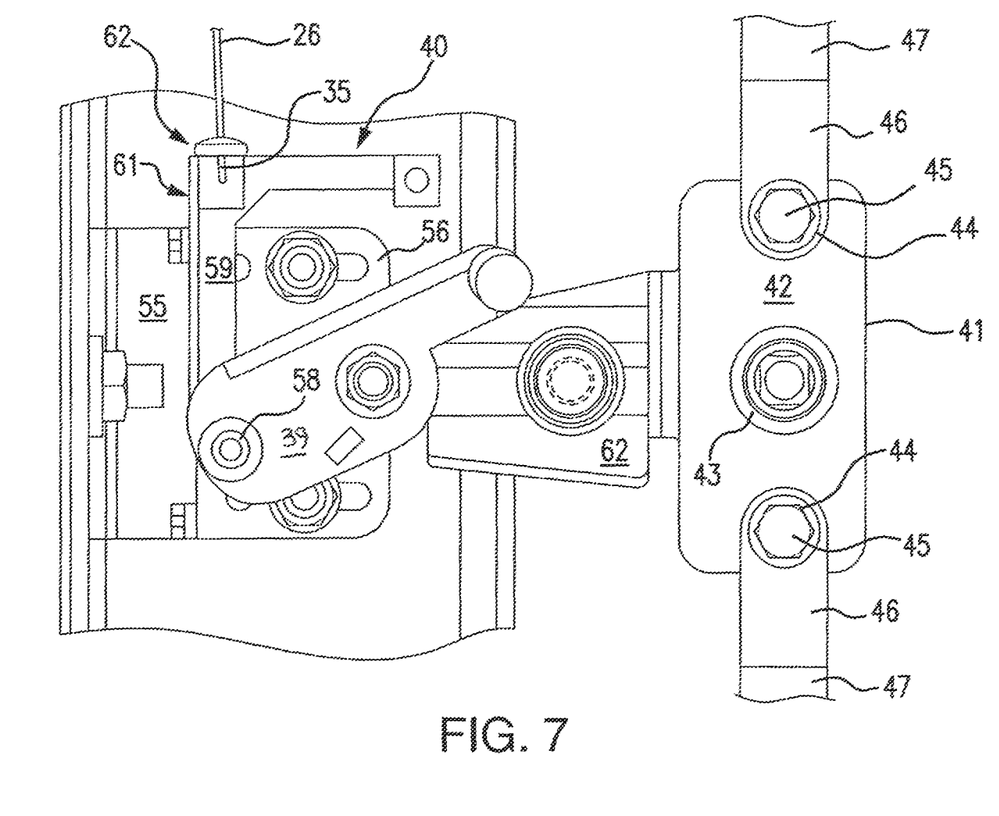
FIG. 7 is an enlarged full back view of the second defeater assembly of this invention.

Turning now to the second defeater assembly 40, there is shown in FIG. 7 an enlarged version of the second defeater assembly 40.

There is shown a base mounting bracket 55, an adjustable mounting bracket 56, a pivot bushing 57, a cam lever 58, a pivot arm 59, and a second defeater 39.

It should be noted that the leading end 35 of the continuum 26 is attached to pivot arm 59 at the back end 61, and at the top 62 thereof.

In operation, latch stem 62 for the door rod assembly is dropped over the edge of the door frame 54 of door 3, which latches the door in place at the bottom of the door.

When handle 7 is turned to open the disconnect cabinet door 3A, the push-pull cable 15 is drawn towards the assembly 8 and the pivoting latch 10 drops down. When the push-pull cable 15 is drawn down, it causes movement on the first defeater and the second defeater in tandem whereupon the first defeater drops the latch 25 from the disconnect hook 19 and the continuum cable 26 is moved down causing the cam lever 58 to be moved up off of the latch stem 62, in conjunction with the handle 6 movement to unlatch the ramps 48 from the door frame 54 and causing a release of the door 3.

It should be noted that the rotary lock component 9, when in a locked position, abuts the pivoting latch 10 and holds it in place so that the entire push-pull cable 15 system is locked. When the rotary lock component 9 is turned by handle 7, the entire system for both doors unlock simultaneously.

What is claimed is:

1. A cable operated mechanical locking external disconnect enclosure, said cable operated mechanical locking external disconnect enclosure comprising:
   a. a housing, said housing being a main metal cabinet having at least one main enclosure door in a front thereof, and affixed to a side of said main metal cabinet, a disconnect enclosure cabinet, each said cabinet having a door handle;
   b. said disconnect enclosure cabinet door handle being affixed to a rod, said rod extending through a disconnect enclosure cabinet door and extending to and mechanically attaching to a power module such that power to the power module is capable of being turned on or off by said disconnect enclosure cabinet door handle and rod;
   c. fixedly attached to said rod, located at said disconnect enclosure cabinet door, a rotary lock, said rotary lock interfacing and interacting with a pivoting latch, said pivoting latch being fixedly located on an inside wall of said disconnect enclosure cabinet;
   d. said pivoting latch having attached thereto, a push-pull cable, said push-pull cable being fixedly attached to a first defeater assembly by a top spring, said first defeater assembly being fixedly attached on an inside wall of said main metal cabinet, said first defeater assembly comprised of a main assembly and an adjunct assembly, a first defeater of said first defeater assembly interfacing and interacting with a second main mechanical defeater assembly fixedly attached on an inside surface of said main metal cabinet;
   e. said adjunct assembly being fixedly attached to said inside surface of said main enclosure door;
   f. said first defeater of said first defeater assembly being fixedly attached to a lower spring, said lower spring being fixedly attached at an opposite end, to said second mechanical defeater assembly, said second main mechanical defeater assembly being fixedly attached to the inside wall of said main metal cabinet, said second main mechanical defeater assembly comprised of a second main assembly and a second adjunct assembly, a second defeater of said second defeater assembly interfacing and interacting with said second adjunct assembly fixedly attached on an inside surface of said main enclosure door.

2. The cable operated mechanical locking external disconnect enclosure as claimed in claim 1 wherein, in addition, there is present handles for manual defeater bypasses for each cabinet.

* * * * *